United States Patent
Miller et al.

(10) Patent No.: US 11,827,383 B2
(45) Date of Patent: Nov. 28, 2023

(54) ENCAPSULATED INSULATION WITH UNIFORMLY HEATED SURFACES FOR USE ON SPACECRAFT INTERNAL SURFACES

(71) Applicant: Sierra Space Corporation, Broomfield, CO (US)

(72) Inventors: Stephen W. Miller, Longmont, CO (US); Michael J. Erdmann, Lafayette, CO (US)

(73) Assignee: Sierra Space Corporation, Broomfield, CO (US)

( * ) Notice: Subject to any disclaimer, the term of this patent is extended or adjusted under 35 U.S.C. 154(b) by 714 days.

(21) Appl. No.: 16/844,938

(22) Filed: Apr. 9, 2020

(65) Prior Publication Data

US 2021/0316888 A1    Oct. 14, 2021

(51) Int. Cl.
*B64G 1/50*    (2006.01)
*B64G 1/58*    (2006.01)
*B64G 1/46*    (2006.01)
*B64G 1/48*    (2006.01)

(52) U.S. Cl.
CPC ............... *B64G 1/58* (2013.01); *B64G 1/46* (2013.01); *B64G 1/48* (2013.01); *B64G 1/50* (2013.01)

(58) Field of Classification Search
CPC ... B64G 1/46; B64G 1/48; B64G 1/50; B64G 1/503; B64G 1/58; B64G 1/60; B64D 2013/0603; B64D 2013/0662; B64C 1/066; B64C 1/067
See application file for complete search history.

(56) References Cited

U.S. PATENT DOCUMENTS

| | | | |
|---|---|---|---|
| 4,162,701 A | 7/1979 | Ollendorf | |
| 4,388,964 A * | 6/1983 | Almgren | B64G 1/50 165/104.31 |
| 4,420,035 A * | 12/1983 | Hewitt | B64G 1/503 165/41 |
| 4,919,366 A * | 4/1990 | Cormier | B64C 1/38 220/592.21 |
| 5,038,693 A * | 8/1991 | Kourtides | B32B 5/26 442/376 |
| 5,429,851 A * | 7/1995 | Sallee | B64G 1/12 428/221 |
| 5,565,254 A * | 10/1996 | Norvell | B32B 5/18 428/134 |
| 5,928,752 A * | 7/1999 | Newquist | B64G 1/58 442/13 |
| 6,007,026 A * | 12/1999 | Shorey | F16L 59/026 244/119 |

(Continued)

OTHER PUBLICATIONS

International Search Report and Written Opinion, Int'l Pat. App. PCT/US2021/026466, dated Jul. 9, 2021 (13 pp.).

*Primary Examiner* — Christopher D Hutchens
*Assistant Examiner* — Michael A. Fabula
(74) *Attorney, Agent, or Firm* — Mintz Levin Cohn Ferris Glovsky and Popeo, P.C.

(57) ABSTRACT

A surface heating device and related method includes a heater assembly having a layer of dielectric material, thermal insulation material positioned adjacent to the heater assembly, an encapsulation layer surrounding the thermal insulation material and connected to the heater assembly, and a controller configured to control power delivered to the heater assembly to activate the dielectric material to generate heat.

11 Claims, 9 Drawing Sheets

(56) References Cited

U.S. PATENT DOCUMENTS

| | | | |
|---|---|---|---|
| 6,497,390 B1* | 12/2002 | Fischer | F16L 59/02 |
| | | | 428/102 |
| 2006/0046598 A1* | 3/2006 | Shah | B32B 5/022 |
| | | | 442/412 |
| 2006/0138279 A1* | 6/2006 | Pisarski | B64C 1/18 |
| | | | 244/118.5 |
| 2007/0063104 A1* | 3/2007 | Humphries | B64G 4/00 |
| | | | 244/158.1 |
| 2007/0245534 A1* | 10/2007 | Sudre | A44B 18/0038 |
| | | | 264/103 |
| 2008/0078129 A1* | 4/2008 | Wood | B64C 1/18 |
| | | | 52/127.1 |
| 2008/0302910 A1* | 12/2008 | Calamvokis | B64D 15/12 |
| | | | 244/118.5 |
| 2010/0051751 A1* | 3/2010 | Mueller | B64G 1/60 |
| | | | 244/158.9 |
| 2014/0124626 A1* | 5/2014 | Clay | B64G 1/14 |
| | | | 244/159.3 |
| 2014/0124627 A1* | 5/2014 | Clay | B64G 1/60 |
| | | | 244/159.3 |
| 2015/0373781 A1 | 12/2015 | Augustine et al. | |
| 2016/0341857 A1 | 11/2016 | Davis | |
| 2017/0240301 A1* | 8/2017 | Aylmer | B64G 1/62 |
| 2017/0247126 A1 | 8/2017 | Blanding et al. | |
| 2019/0078599 A1* | 3/2019 | Pinney | F02K 1/822 |
| 2020/0305239 A1* | 9/2020 | Wu | H05B 3/18 |
| 2021/0037645 A1* | 2/2021 | Levesque | B64C 7/00 |
| 2021/0101668 A1* | 4/2021 | Risse | B64C 1/06 |
| 2022/0288997 A1* | 9/2022 | Krier | H05B 3/145 |

* cited by examiner

ENCAPSULATED INSULATION WITH UNIFORMLY HEATED SURFACES FOR USE ON SPACECRAFT INTERNAL SURFACES

TECHNICAL FIELD

The present disclosure relates generally to systems and methods for heating surfaces, and more particularly relates to devices, systems and methods for heating surfaces of a vehicle such as a spacecraft.

BACKGROUND

To prevent long term mold/contamination growth and the formation of water droplets that may pose safety issues, NASA requires that all internal, habitable surfaces of a spacecraft be maintained above the dew point. This prevents the formation of condensation and the aforementioned issues. Since spacecraft are typically made primarily from aluminum and other metal materials, it has traditionally been relatively easy to heat the internal, habitable surfaces of the spacecraft with resistive elements that heat limited portions of the surface and the metal material evenly distributes the heat across the entire surface. The amount of energy needed to heat the internal, habitable surfaces of a spacecraft when using metal materials is relatively low and within the power storage requirements for most spacecraft.

The development of spacecraft that include composite materials has resulted in challenges associated with adequately heating the internal, habitable surfaces of a spacecraft with the limited power storage available for most aircraft. Due to the thermal characteristics of composites (i.e., poor thermal conductors), the traditional method of applying resistance heaters to a metal surface to maintain inner, habitable surfaces above a desired temperature, are not feasible in terms of power needs. Therefore, there is a need related to evenly distributing heat and minimize electrical power for composite materials on spacecraft.

SUMMARY

The present disclosure relates to a combination of insulating materials (e.g., insulation, encapsulation of insulation, and attachment) and heating elements (e.g., electrical films) to produce an insulating/heating assembly that significantly reduces heater power as applied to the internal, habitable volumes of a vehicle, such as a spacecraft.

One aspect of the present disclosure relates to a surface heating device that includes a heater assembly comprising a layer of dielectric material, thermal insulation material positioned adjacent to the heater assembly, an encapsulation layer surrounding the thermal insulation material and connected to the heater assembly, and a controller configured to control power delivered to the heater assembly to activate the dielectric material to generate heat.

The surface heating device may have a flexible construction. The encapsulation layer may include waterproof or water resistant material. The controller may operate to control the power delivered based on predetermined on/off set points. The surface heating device may include at least one attachment member to releasably secure the surface heating device to a support structure. The attachment member may include at least one of hook and pile material, adhesives, or fasteners. The encapsulation layer may include at least one of polyimide, polyvinyl fluoride (PVF), or biaxially-oriented polyethylene terephthalate (BoPET). The encapsulation layer may be connected to the heater assembly with an adhesive. The surface heating device may include at least one temperature sensor configured to detect a temperature of the layer of dielectric material, and the controller may be operable at least in part based on signals received from the at least one temperature sensor. The heater assembly may include at least two bus bars extending across the layer of dielectric material, and the bus bars may be connected to a source of power controlled by the controller. The surface heating device may include at least one stand-off structure extending through the heater assembly, the thermal insulation material, and the encapsulation layer. The stand-off structure may be connected to the encapsulation layer. The thermal insulation material may include at least one of fiberglass insulation, polystyrene (e.g., Styrofoam®) insulation, aerogel, air bladders, and structural ribs or standoffs that provide hollow spaces. The layer of dielectric material may have a width dimension in the range of about 4 inches to about 36 inches, and a length dimension in the range of about 8 inches to about 60 inches.

Another aspect of the present disclosure relates to a surface heating device to control surface temperatures inside a spacecraft. The device includes a heater assembly, an insulation layer, an encapsulation layer, and attachment member, and a controller. The heater assembly includes a surface to be heated, wherein the surface is defined by a heater element and is exposed within an interior of the spacecraft. The insulation layer is positioned between the heater assembly and an exterior structure of the spacecraft. The encapsulation layer encloses the insulation layer and is connected to the heater assembly. The attachment member is configured to releasably attach the encapsulation layer to the exterior structure of the spacecraft. The controller is configured to control the heater assembly to generate heat.

The heater element may include a layer of dielectric material. The encapsulation layer may provide a waterproof or water resistant enclosure for the insulation layer. The controller may be connected to the heater element with a plurality of wires. The surface heating device may include at least one temperature sensor configured to detect a temperature of the surface to be heated and generate a temperature signal used by the controller.

A further aspect of the present disclosure relates to a method of controlling surface temperatures inside a spacecraft. The method includes providing a surface heating device having a heater assembly, thermal insulation material positioned adjacent to the heater assembly, an encapsulation layer surrounding the thermal insulation material and connected to the heater assembly, and a controller. The method also includes releasably mounting the encapsulation layer to a structure of the spacecraft with a surface of the heater assembly exposed within an interior of the spacecraft, and operating the heater assembly with the controller to generate heat in the surface. Operating the heater assembly may include directing a power supply across a layer of dielectric material.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
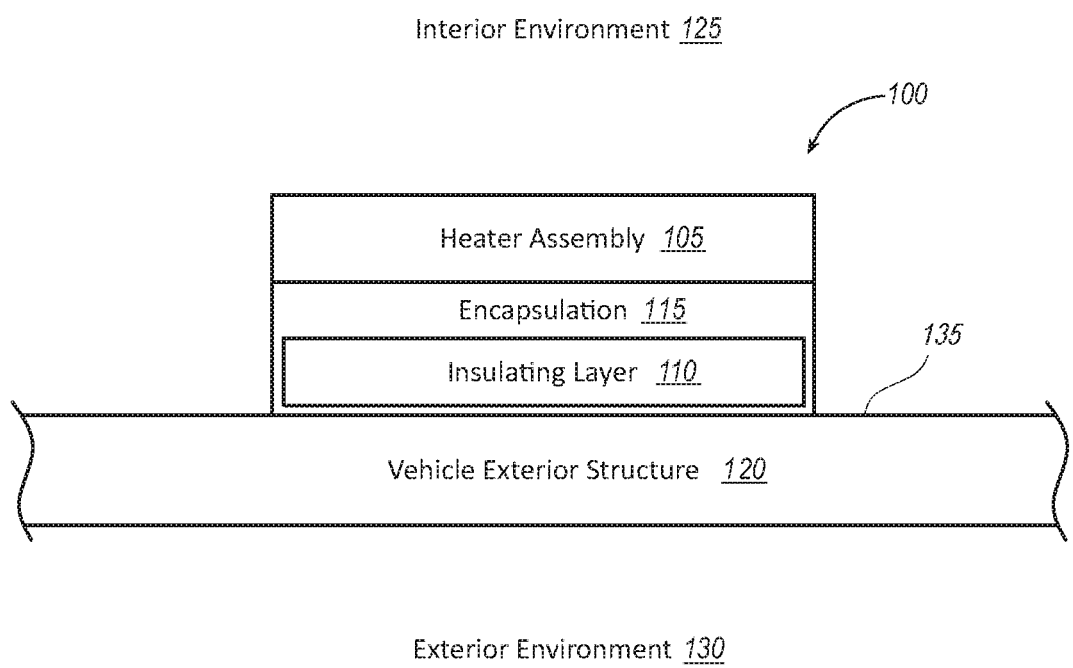
FIG. 1 is a schematic diagram of a surface heating device in accordance with the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Thermal analysis results show that the amount of heater power needed to keep the internal, habitable surfaces comprised primarily of composite materials above the dew point for vehicles, particularly spacecraft, exceeded the vehicle's electrical generation capability. The present disclosure relates to a lower power solution for maintaining such surfaces at the desired temperature. One example heating device includes a high-performance, lightweight insulation that could be encapsulated in a thin lightweight material to prevent loose debris from entering the cabin atmosphere. Another example includes use of heater elements that could evenly spread thermal energy across a thin surface. These features may be combined into a single surface heating device or "heater pillow."

The devices, systems, and methods of the present disclosure help maintain internal surfaces of the vehicle above the dew point and minimize heater power by applying an encapsulated insulation layer between the vehicle surface (e.g., composite material) and the heating element. The thickness of the insulation may be tailored as needed to allow more or less clearance to surrounding structure of the vehicle. The thicker the insulation, the less heater power typically is required for a given type of insulation. The heater element itself may make use of electrical properties of dielectric materials, such as the 200RS100 Kapton® polyamide film product available from Dupont, and may provide a relatively even electrical resistance per a given area. When the electrical source is applied to opposite ends of a sheet of the dielectric material, the dielectric material provides a uniform distribution of energy across the entire surface, which heats the material to a desired temperature. In this case, the desired temperature typically is above a defined dew point.

The surface heating devices disclosed herein may comprise flexible materials that permit deforming and shaping the heating device to fit three-dimensional, complex shapes. The heating devices may be attached to the base vehicle structure using any of a variety of different attachment features, such as a dual-lock hook and pile system, adhesives, or mechanical fasteners. Further, multiple heating devices can be connected in side-by-side arrangements, for example, by sealing edges with a tape to prevent air flow behind the assembly.

Some of the unique features of the surface heating devices and related systems and methods disclosed herein include, for example: a) a flexible heating element that can still operate if punctured/cut, thus allowing for cut outs and pass thru elements (e.g., standoffs and fasteners), b) variable insulation thickness that can be tailored to surrounding structure and temperature conditions, and c) assembly flexibility that allows the heating device to be conformed to complex, three dimensional shapes.

FIG. 1 illustrates schematically an example surface heating device 100 mounted to a vehicle exterior structure 120. In at least some examples, the vehicle is a spacecraft or other vehicle intended to be operated in outer space. The vehicle may be a spacecraft that has an interior environment 125, and the exterior structure 120 separates the interior environment 125 from an exterior environment 130. In some situations, the interior surface 135 of the vehicle must be maintained at a predetermined temperature in order to avoid condensation forming on the surface 135. This predetermined temperature may be above the dew point for given air conditions within the interior environment 125 (i.e., air temperature and air humidity). One way to meet the surface temperature requirements is to mount the heating device 100 to the surface 135, wherein the surface heating device 100 defines a new surface that is exposed within the interior environment 125 in place of the surface 135.

The surface heating device 100 includes a heating layer 105 (also referred to as a heater assembly) that defines the new surface exposed within the interior environment 125. The heating layer 105 is spaced apart from the surface 135 of the exterior structure 120 by an insulating layer 110. An encapsulation 115 is formed around the insulating layer 110 to ensure that the material of the insulating layer 110 does not escape into the interior environment 125. The encapsulation 115 may be secured to the heating layer 105. The surface heating device 100 may be formed as an assembly that is attachable to and detachable from the surface 135 of the exterior structure 120 using, for example, an attachment device. The surface heating device 100 may comprise flexible, pliable materials that permit mounting the surface heating device 100 to surfaces 135 of different shapes, sizes, etc. For example, the surface 135 may have a contoured shape such as a concave shape, and the surface heating device 100 conforms to the shape of the surface 135.

The heating layer 105 may be electrically connected to a power source and controller. The controller may operate to provide a supply of power to the heating layer 105 for the purpose of generating heat along a surface of the heating layer 105 that is exposed within the interior environment 125. A plurality of surface heating devices 100 may be positioned side-by-side to fully cover the surface 135 of the exterior structure 120. At least some of the heating devices may be electrically coupled to each other to provide a heating zone that is independently controllable by the controller. Different zones may have different heating requirements depending on, for example, the physical characteristics of the exterior structure 120, environmental conditions for the interior environment 125 and exterior environment 130, and other properties for the vehicle. The heater assembly 105 may be referred to as a heated surface, heater element, or a device that includes a heated surface or heater element. The heater assembly 105 may comprise, for example, a resistive heater (i.e., etched foil heater in polyimide or silicone or a mica heater) or a dielectric material. Typically, the heater assembly 105 includes a heating device that operates based on relatively low-power supply to provide a relatively even distribution of heat across an exposed surface of the heater assembly.

The insulating layer 110 may also be referred to as an insulating material, stuffing, thermal insulation, low-thermal conductivity material, thermal isolation material, or insulating layer or material that comprises one of these components. The insulation may comprise, for example, a bulk insulation such as Corning® fiberglass, generic fiberglass, Johns Manville® fiberglass, Styrofoam, or any other foam-based insulation. The insulating layer 110 may comprise other types of materials such as aerogel, air bladders, or structural ribs or standoffs with hollow surfaces.

The encapsulation 115 may be referred to as an encapsulation material or encapsulation layer. In at least some examples, the encapsulation 115 may comprise a generic adhesive positioned between the encapsulation and the heater assembly 105. There may be a generic attachment system operable between the encapsulation 115 and the exterior structure 120. The attachment system may include, for example, an adhesive, hook-and-pile material (e.g., Vetcro®), fasteners, or any other attachment method or system desirable for a particular design. The encapsulation 115 may comprise, for example, Kapton®, Tedlar®, Mylar®, and other flexible, lightweight materials that are compatible with the design environment (e.g., a spacecraft interior environment). In at least some arrangements, the portion of the encapsulation 115 positioned between the insulating layer 110 and the exterior structure 120 has water resistant properties and/or is waterproof. Furthermore, the encapsulation 115 generally seals the insulating layer 110 therein so as to prevent any of the insulating material of the insulating layer 110 from escaping into the interior environment 125. The encapsulation 115 may provide a sealed interior, and the sealing may be provided using, for example, adhesives, sewing, heat welding, tape, or the like.

Figure 2:
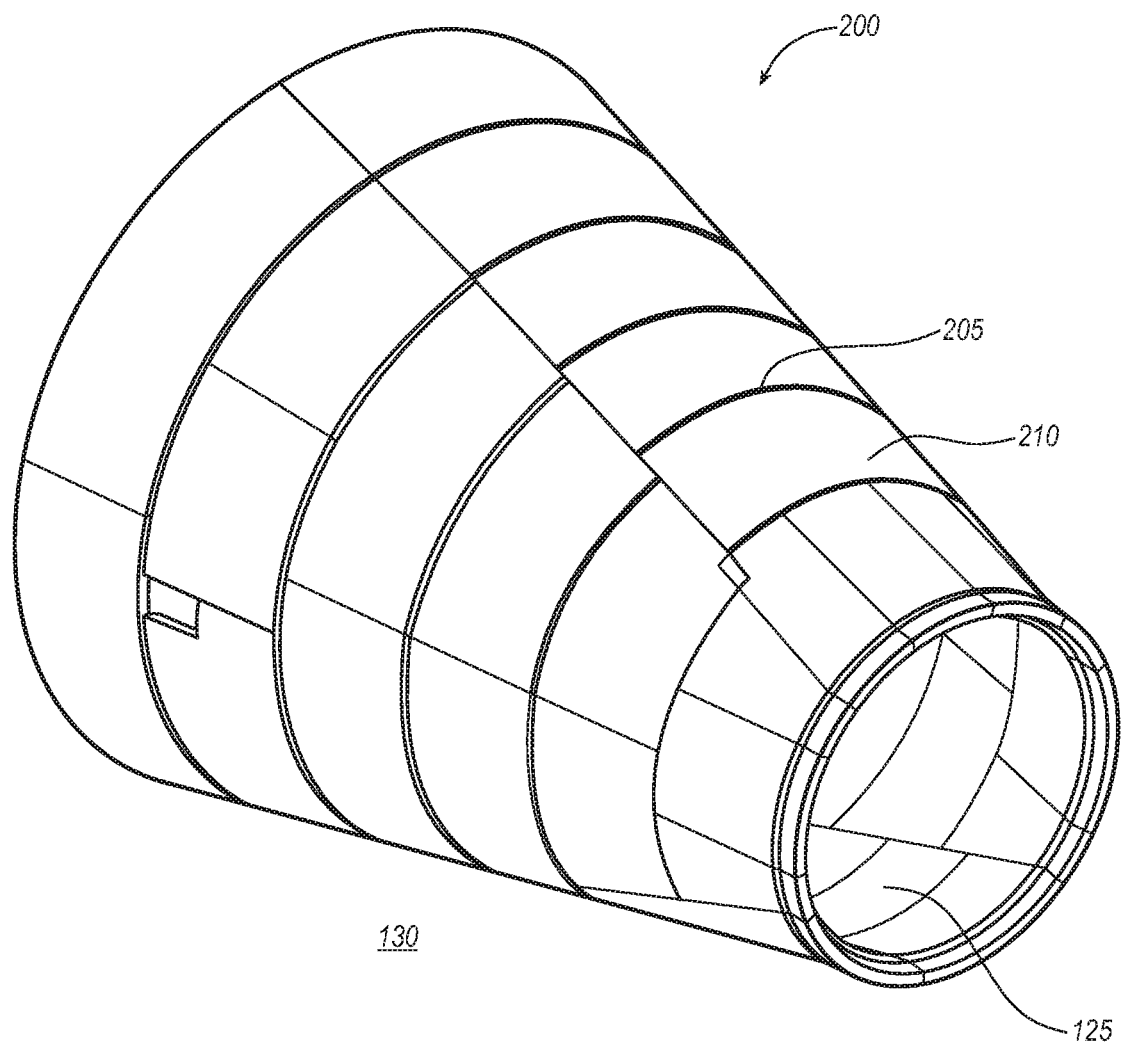
FIG. 2 is a schematic perspective view of a portion of a spacecraft with a plurality of surface heating devices mounted thereto.

Referring now to FIG. 2, an example vehicle 200 (i.e., spacecraft), is shown with a plurality of surface heating devices 100 mounted thereto. The vehicle 200 includes an exterior structure 120, a plurality of support members 205 exposed along the interior surface, and a plurality of surface regions 210 into which a plurality of surface heating devices 100 are positioned. The heating devices 100 may have different shapes and sizes as shown in FIG. 2. Furthermore, the heating devices 100 conform to the contoured (i.e., concave) shape of the vehicle 200. The dimensions for the heating devices 100 may vary significantly from a few inches to several feet.

Figure 3:
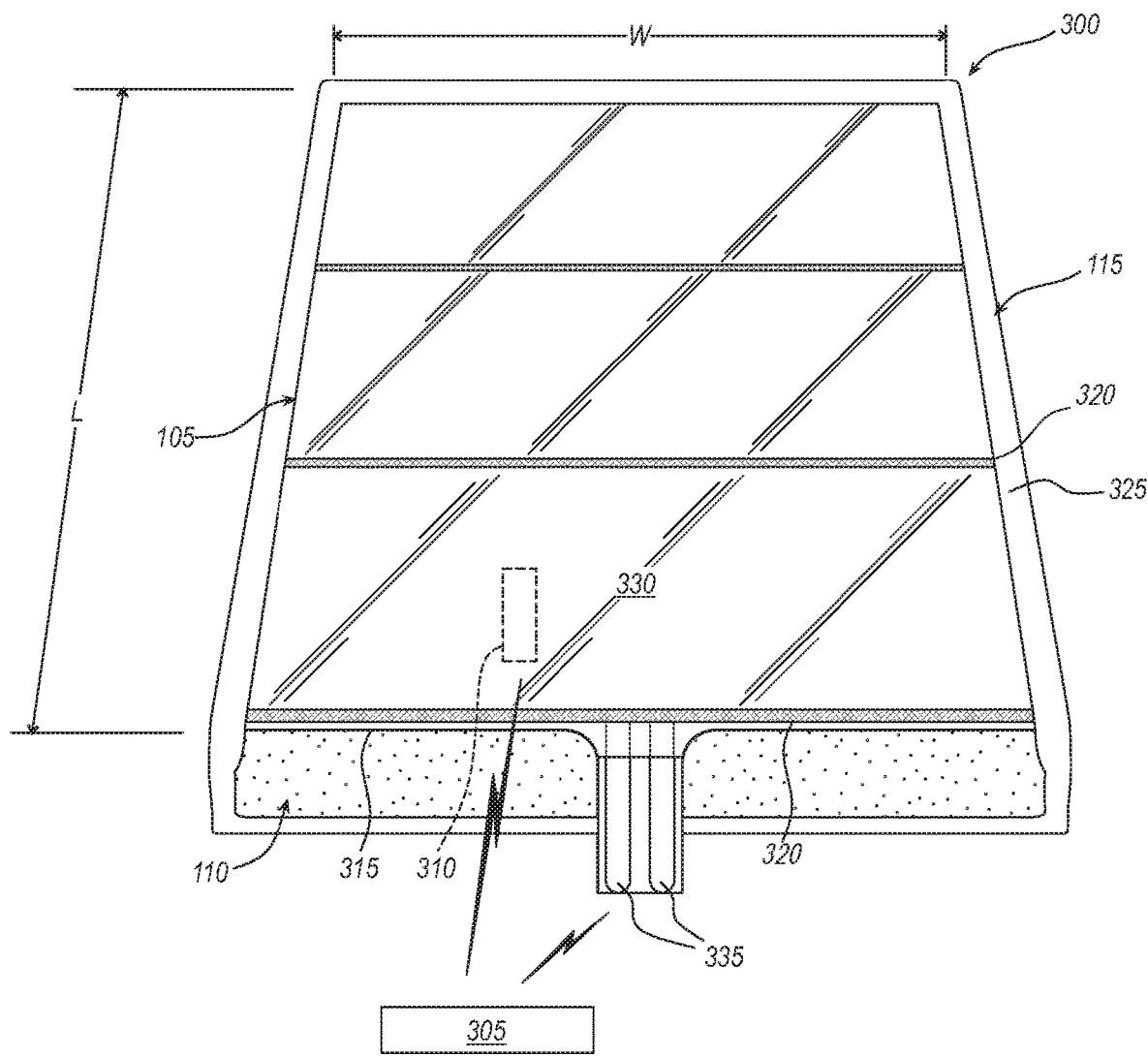
FIG. 3 is a perspective view of another example surface heating device in accordance with the present disclosure.

Referring now to FIG. 3, another example heating device 300 is shown and described. The heating device 300 includes a heater assembly 105, insulating material 110, and encapsulation 115. The heater assembly 105 is electrically connected to a controller 305. A temperature sensor 310, which operates to detect a temperature generated by the heater assembly 105, is also electrically connected to the controller 305 (e.g., via the leads 335). The controller 305 may be programmed to provide a supply of power to the heater assembly 105 to generate heat (e.g., until a set point temperature is reached). The temperature sensor 310 may provide a temperature signal to the controller 305 to provide a feedback loop for the heater assembly 105 to reach and then maintain a desired temperature.

The heater assembly 105 includes a dielectric sheet 315 or other heat-generating member, bus bars 320, a perimeter edge 325, an exposed surface 330, and power leads 335. Power is provided to the bus bars 320 via the power leads 335. The power is distributed from the bus bars 320 into the dielectric sheet 315, which causes generation of heat. Typically, the heater assembly 105 is designed such that it can be punctured, cut, etc. without significantly impacting the overall performance of the heater assembly 105 to generate heat, unless the bus bars 320 or power leads 335 are severed.

The heater assembly 105 is connected to the encapsulation 115 around the perimeter edge 325. The connection may be formed using, for example, an adhesive, tape, or the like. Securing the encapsulation 115 to the heater assembly 105 may concurrently seal closed an interior space provided in which the insulating material 110 is positioned. In some embodiments, one end of the surface heating device 100 may be releasably closed so as to permit removal, insertion, or replacement of the insulating material as desired to change an insulating rating or effect of the heating device 100. The releasable opening may include, for example, a zipper closure, tape, or fastener.

The temperature sensor 310 may be positioned at any location along the heater assembly 105. Typically, the temperature sensor 310 is positioned on an opposite side from the exposed surface 330 so as to be protected from environmental conditions. The temperature sensor 310 may include sensor leads that are coupled electrically to the controller 305. In some arrangements, the sensor leads 350 and power leads 335 may be connected to a harness or other cable that is connected to the controller 305.

FIG. 3 also shows length L and width W dimensions for the heating device 100. The heating device 100 may also include a thickness (e.g., a thickness T shown in FIG. 4). A thickness may be defined in large part by the thickness of the insulating material 110.

Figure 4:
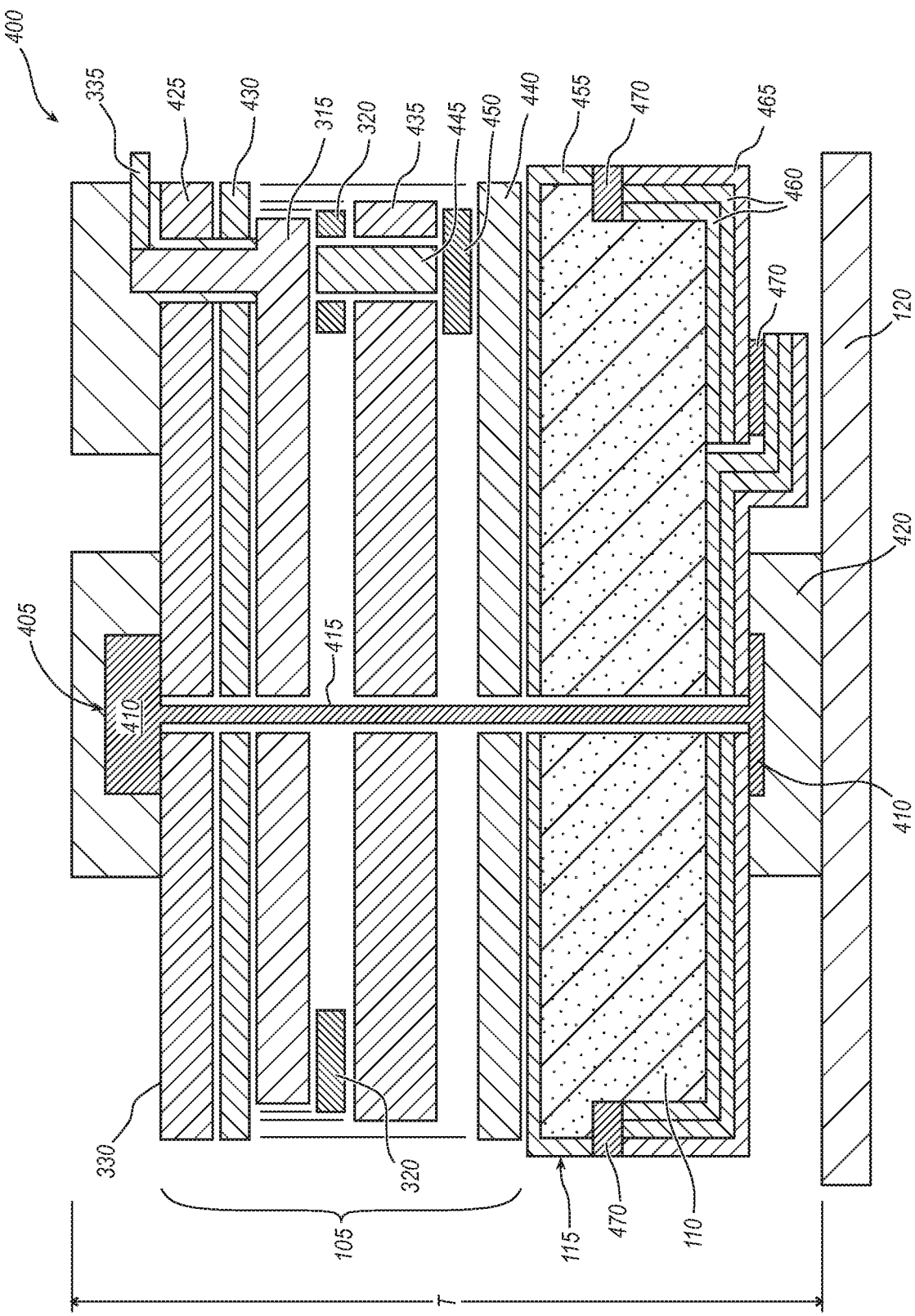
FIG. 4 is a schematic cross-sectional view of another example surface heating device in accordance with the present disclosure.

FIG. 4 illustrates in another example surface heating device 400 that includes many of the same or similar features as described above with reference to FIGS. 1-3. The surface heating device 400 may include the heater assembly 105, insulating material 110, encapsulation 115, and at least one standoff 405. The standoff 405 includes a shaft 415 that extends through the layers of a heating device 400, and head members positioned at opposite ends of the shaft 415. The head members 410 and 420 may be secured to respective surfaces of the heater assembly 105 and encapsulation 115 to provide a secure connection thereto. The standoffs 405 may assist in spacing apart layers of the heating device 400 and may help prevent undesired compaction of the insulating material 110.

The heater assembly 105 may include the dielectric sheet 315, bus bars 320, exposed surface 330, and power leads 335. The heater assembly 105 may further include a cover layer 425 that defines the exposed surface 330, a bonding layer 430, a base layer 435, a backing layer 440, weld access filler 445, and a dielectric shield 450. The heater assembly 105 may be bonded together in a laminate structure, or otherwise connected together to provide a self-contained assembly. In one example, the heater assembly has a total thickness in the range of about 10 mil to about 100 mil, and more preferably about 15 mil to about 30 mil. The remaining portion of the heating device 400, including the insulating material 110 and encapsulation 115, may have a thickness in the range of about 1 inch to about 3 inches, depending largely on the thickness of the insulating material 110. The total thickness of the layers of the encapsulation are typically in the range of about 5 mil to about 15 mil.

The encapsulation 115 may include a top cover 455, base layers 460, a water resistant layer 465, and a bonding joint 470. The combination of the insulating material 110 and encapsulation 115 may generally be described as a pillow assembly or insulation assembly to which the heater assembly 105 is connected. The encapsulation 115 may provide a releasable opening to permit adjusting the amount or type of insulating material 110 enclosed therein. The schematic diagram shown in FIG. 4 is exemplary only, and may comprise different layers, components, thicknesses, and the like in other embodiments.

Figure 5:
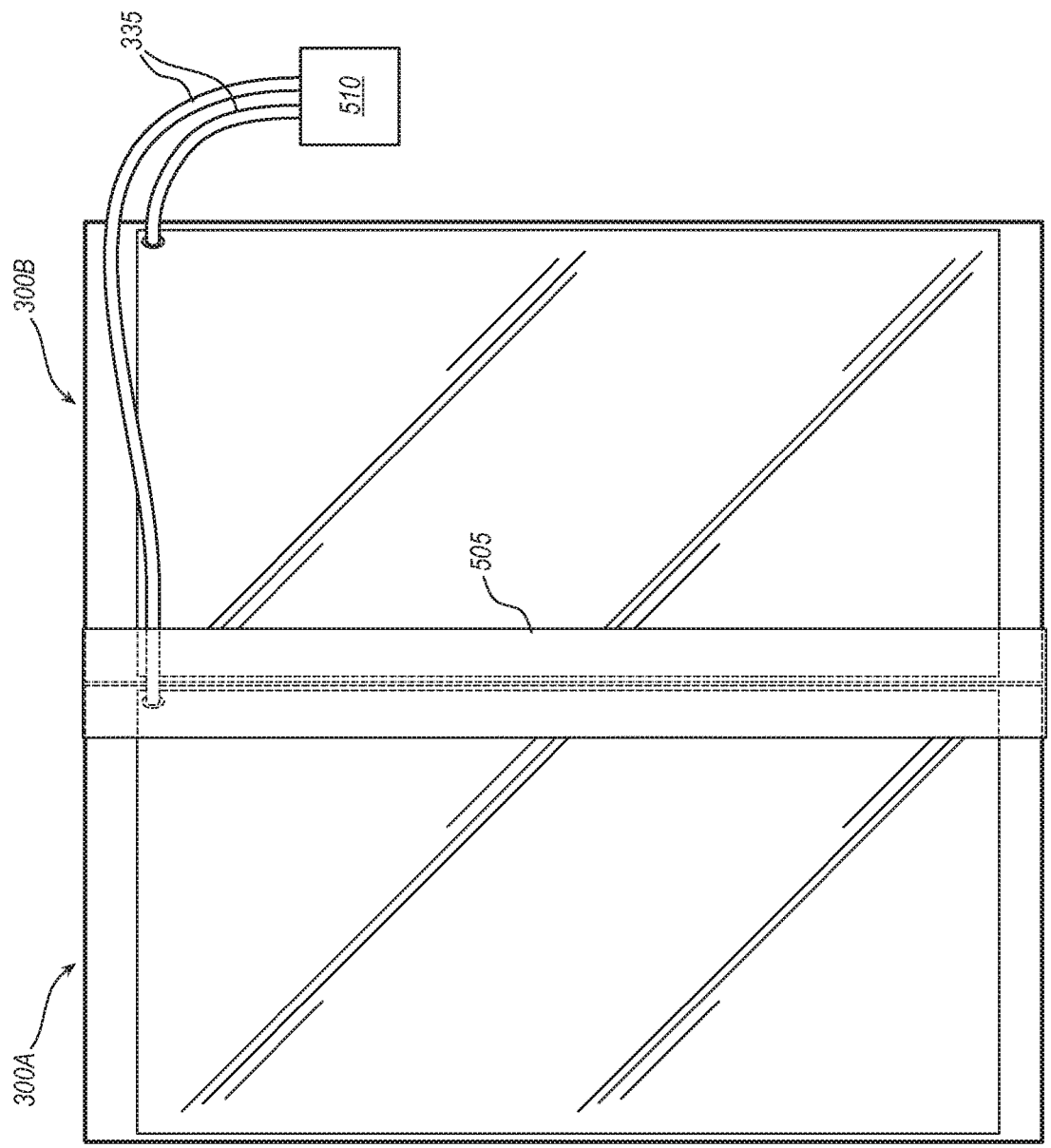
FIG. 5 is a top view of an assembly of a plurality of surface heating devices in accordance with the present disclosure.

FIG. 5 illustrates a pair of surface heating devices 300A, 300B positioned side-by-side and connected with a strip of connecting materials 505 such as tape. The power leads 335 from each of the heating devices 300A, 300B may be connected together at a harness 510 or other connector that provides consolidated wiring for electronic communication with the controller 305, a power source, circuitry, or additional heating devices. The tape 505 may comprise a material that distributes heat, such as a metal-based tape such as aluminum tape, or any other adhesive-based tape. Alternatively, the abutting encapsulation elements of each heater pillow may be joined with an adhesive to form an air barrier.

The heating devices 300A, 300B may be connected to each other in other arrangements such as end-to-end, end-to-side surface, or the like. As noted above, three or more heating devices may be connected together, such as to form a zone of heating devices that are together controlled to a desired set-point temperature. A plurality of zones may be included on a single vehicle such as the spacecraft 200 shown in FIG. 2.

Figure 6:
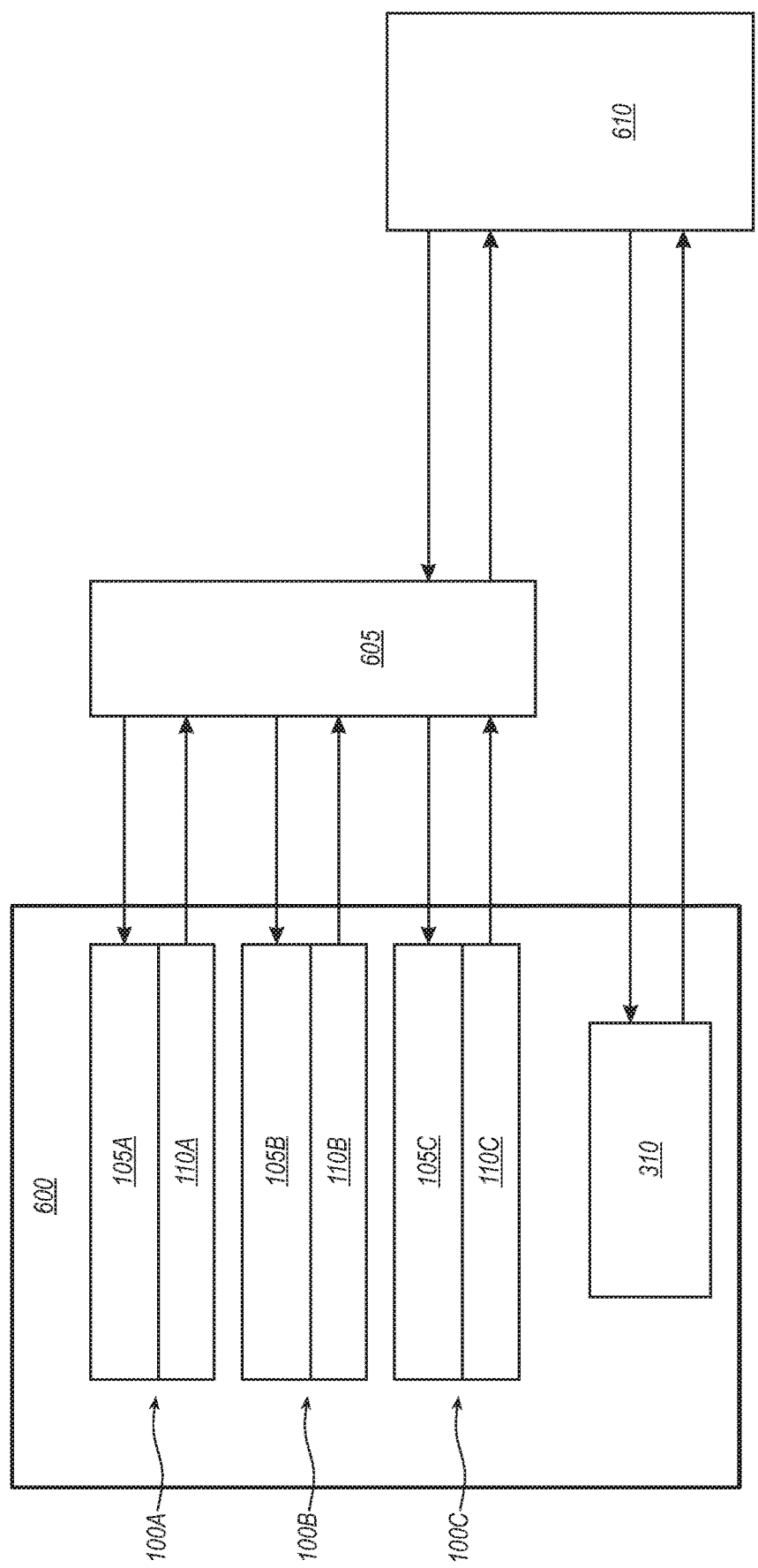
FIG. 6 is a circuit diagram for control of a zone of surface heating devices in accordance with the present disclosure.

FIG. 6 is a schematic circuit diagram showing a heater zone 600 with a plurality of heating devices 100A-100C connected to a terminal block 605 and a heater power controller (HPC). The HPC is also connected to one or more temperature sensors 310 for the zone. Each of the heating devices 100A-100C includes a heater assembly 105A-105C and insulating material 110A-110C, including encapsulation around the insulating material. The heating devices 100A-100C may have the same or similar features as the other surface heating devices disclosed herein.

The terminal block 605 may provide a common connection point for all of the heating devices 100A-100C. The terminal block 605 may have a similar function as the harness 510 described above.

The HPC 610 may provide controlled delivery of power as well as being capable of sending and receiving signals for operation of the heating devices 100A-100C and the temperature sensor 310. A single HPC 610 may be operable to control a plurality of different heater zones 600, each with a plurality of heating devices and at least one temperature sensor. In another arrangement, a single HPC 610 is provided for each zone, and a plurality of HPCs are controlled with a central control unit.

Figure 7:
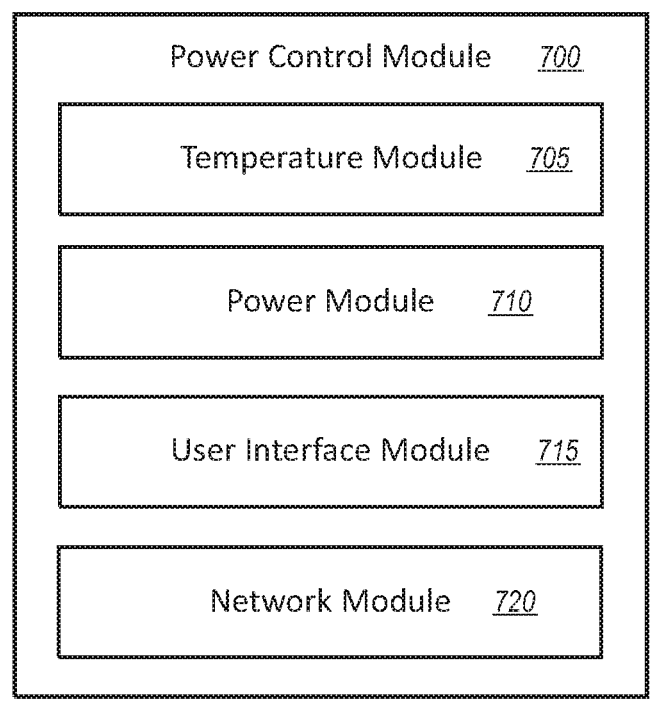
FIG. 7 is a block diagram showing an example power control module in accordance with the present disclosure.

FIG. 7 is a schematic block diagram showing an example power control module 700 in accordance with the present disclosure. The power control module 700 may include a plurality of individual modules such as a temperature module 705, a power module 710, a user interface module 715, and a network module 720. The modules shown in FIG. 7 may each be in communication with each other. The modules shown in FIG. 7 may perform at least one of the operations described herein in conjunction with one or more controllers, transmitters, receivers, or other features of a surface heating device for a vehicle such as a spacecraft. The power control module 700 may include one or more processors and memory and/or one or more storage devices.

The temperature module 705 may be operable to manage sending and/or receiving temperature signals from one or more temperature sensors associated with any one of the heating devices disclosed herein. The temperature module 705 may be programmable to provide a desired set-point temperature for a given heating device or zone of heating devices, based at least in part on sensor signals from one or more temperature sensors.

The power module 710 may be operable to control delivery of power to one or more heating devices. The power module 710 may be operable to control the amount of power, the duration at which power is supplied, and other aspects of the power required for operating one or more heating devices. The power module 710 may also assess an amount of power being used and provide feedback regarding power usage. Power module 710 may provide operation of one or more heating devices based on a total amount of power available over a given time period. Power module 710 may operate to maximize efficiency for sustaining a minimum temperature provided by the heating device based on a given amount of power available for a given time period.

The user interface module 715 may provide a physical and/or electronic interface for a user to interact with controls for the heating device. The user interface module 715 may send and/or receive signals in response to interactions with one or more users. A user interface module 715 may be electrically coupled to one or more input devices such as a keypad, display screen, or the like. The user interface module 715 may provide a display of one or more user selectable options, performance characteristics of one or more heating devices, or the like.

The network module 720 may provide communication between one or more heating devices, HPCs, or other components of the devices and systems disclosed herein and a network, such as a wireless network, to provide desired communication, control, power supply and the like. Network module 720 may provide intercommunication between a plurality of different heating devices, or different zones that each include one or more heating devices. The network module 720 may provide communication between a plurality of terminal blocks (e.g., terminal block 605), HPCs (e.g., HPC 610), or a plurality of temperature sensors (e.g., temperature sensors 310).

Figure 8:
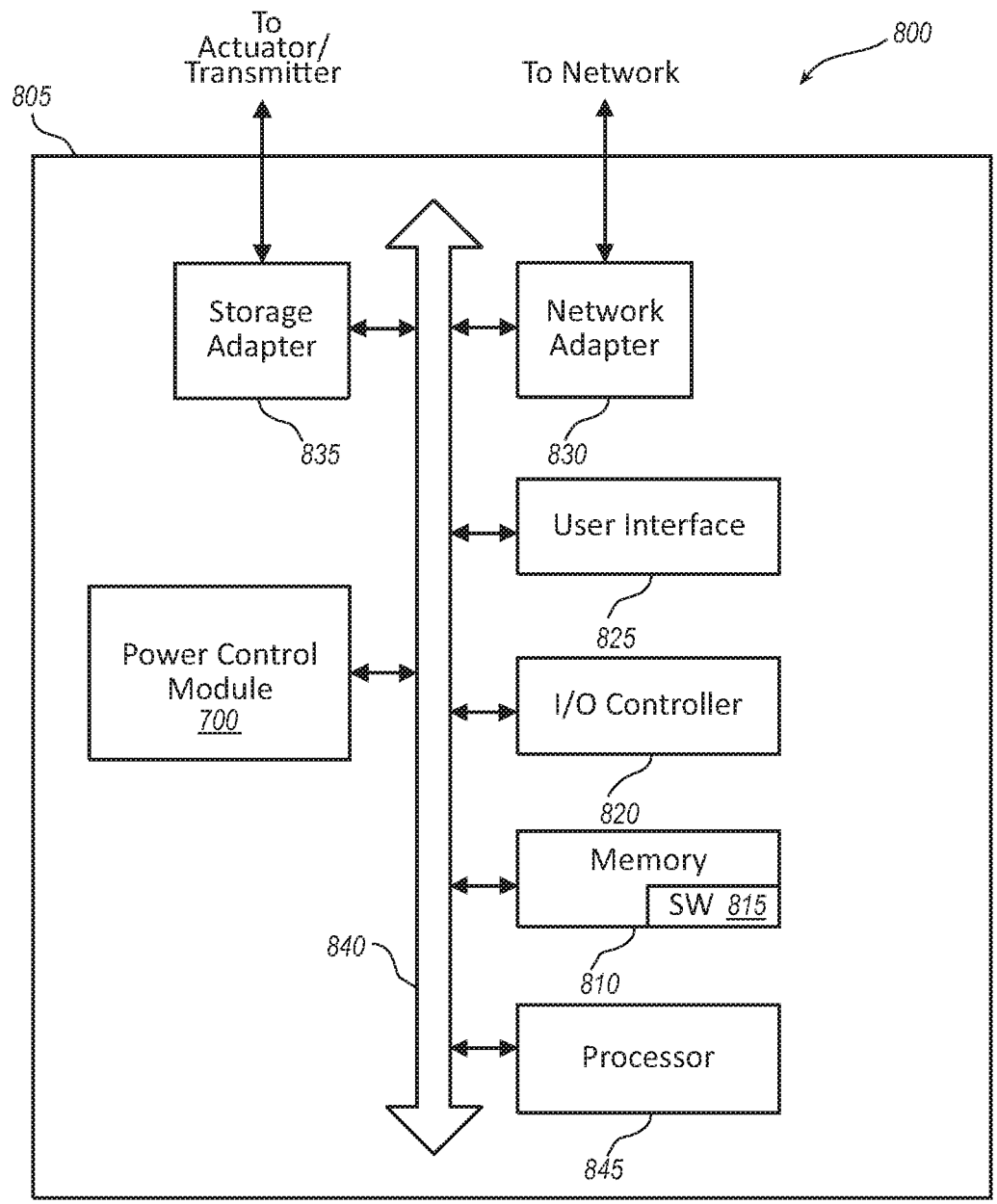
FIG. 8 is one embodiment of an environment in accordance with various aspects of the present disclosure.

Power control module 700 may include fewer or additional modules as compared to those shown in FIG. 7. FIG. 8 shows a surface heating system 800 that may include one or more power control modules 700. System 800 may include an apparatus 805, which may be one example of any one of the heating devices 100, 300, 400, or the module 700 of FIG. 7.

Apparatus 805 may include components for control (e.g., wired or wireless) of a surface heating devices and related communications including components for transmitting communications and components for receiving communications. For example, apparatus 805 may communicate bi-directionally with one or more actuators and/or transmitters, and a network, such as a hospital data network. These bi-directional communications may be direct (apparatus 805 communicating directly with an actuator/transmitter or network, for example) and/or indirect (apparatus 805 communicating indirectly with another device through a server, for example).

Apparatus 805 may also include a processor module 845, memory 810 (including software/firmware code (SW) 815), an input/output controller module 820, a user interface module 825, a network adapter 830, and a storage adapter 835. The software/firmware code 815 may be one example of a software application executing on apparatus 805. The network adapter 830 may communicate bi-directionally, via one or more wired links and/or wireless links, with one or more networks and/or client devices. In some embodiments, network adapter 830 may provide a direct connection to a client device via a direct network link to the Internet via a POP (point of presence). In some embodiments, network adapter 830 of apparatus 805 may provide a connection using wireless techniques, including digital cellular telephone connection, Cellular Digital Packet Data (CDPD) connection, digital satellite data connection, and/or another connection. The apparatus 805 may include power control module 700, which may perform the functions described above for the power control module 700 of FIG. 7.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 830 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof. Such wireless communications signals may be used with any of the devices and systems disclosed herein, such as the surface heating devices 100, 300, 400 or module 700.

One or more buses 840 may allow data communication between one or more elements of apparatus 805 such as processor module 845, memory 810, I/O controller module 820, user interface module 825, network adapter 830, and storage adapter 835, or any combination thereof.

The memory 810 may include random access memory (RAM), read only memory (ROM), flash memory, and/or other types. The memory 810 may store computer-readable, computer-executable software/firmware code 815 including instructions that, when executed, cause the processor module 845 to perform various functions described in this disclosure. Alternatively, the software/firmware code 815 may not be directly executable by the processor module 845 but may cause a computer (when compiled and executed, for example) to perform functions described herein. Alternatively, the computer-readable, computer-executable software/firmware code 815 may not be directly executable by the processor module 845, but may be configured to cause a computer, when compiled and executed, to perform functions described herein. The processor module 845 may include an intelligent hardware device, for example, a central processing unit (CPU), a microcontroller, an application-specific integrated circuit (ASIC), field programmable gate array (FPGA), or any combination thereof.

In some embodiments, the memory 810 may contain, among other things, the Basic Input-Output system (BIOS) which may control basic hardware and/or software operation such as the interaction with peripheral components or devices. For example, at least a portion of the power control module 700 to implement the present systems and methods may be stored within the system memory 810. Applications resident with system 800 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 830.

Many other devices and/or subsystems may be connected to and/or included as one or more elements of system 800 (for example, a personal computing device, mobile computing device, smart phone, server, internet-connected device, cell radio module, or any combination thereof). In some embodiments, all of the elements shown in FIG. 8 need not be present to practice the present systems and methods. The devices and subsystems can be interconnected in different ways from that shown in FIG. 8. In some embodiments, an aspect of some operation of a system, such as that shown in FIG. 8, may be readily known in the art and are not discussed in detail in this application. Code to implement the present disclosure can be stored in a non-transitory computer-readable medium such as one or more of system memory 810 or other memory. The operating system provided on I/O controller module 820 may be a mobile device operation system, a desktop/laptop operating system, or another known operating system.

The I/O controller module 820 may operate in conjunction with network adapter 830 and/or storage adapter 835. The network adapter 830 may enable apparatus 805 with the ability to communicate with devices such as surface heating devices 100, 300, 400, and/or other devices over a communication network. Network adapter 830 may provide wired and/or wireless network connections. In some cases, network adapter 830 may include an Ethernet adapter or Fibre Channel adapter. Storage adapter 835 may enable apparatus 805 to access one or more data storage devices. The one or more data storage devices may include two or more data tiers each. The storage adapter 835 may include one or more of an Ethernet adapter, a Fibre Channel adapter, Fibre Channel Protocol (FCP) adapter, a SCSI adapter, and iSCSI protocol adapter.

Figure 9:
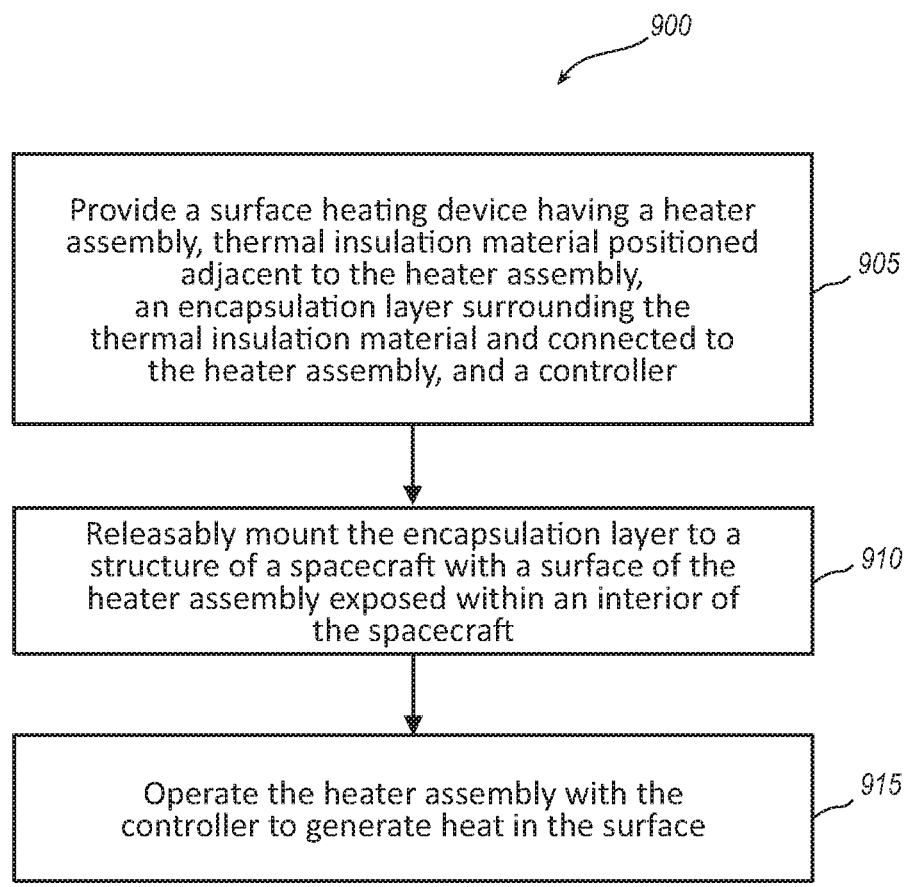
FIG. 9 is a flow diagram showing steps of an example method of operating a surface heating device in accordance with the present disclosure.

FIG. 9 is a flow diagram showing steps of an example method 900 of controlling surface temperatures inside a vehicle, such as a spacecraft or a living space of a building or other living structure. The method 900 may be applicable to any of the devices and systems disclosed herein, individually or in combination, such as the surface heating devices 100, 300, 400 described with reference to FIGS. 1-5, the circuit diagram of FIG. 6, the module 700 of FIG. 7, or the system 800 of FIG. 8.

The method 900 includes, at block 905, a step of providing a surface heating device having a heater assembly, thermal insulation material positioned adjacent to the heater assembly, and encapsulation layers surrounding the thermal insulation material and connected to the heater assembly, and a controller. Block 910 includes releasably mounting the encapsulation layer to a structure of a spacecraft with a surface of the heater assembly exposed within an interior of the spacecraft. Method 900 includes, at block 915, operating the heater assembly with the controller to generate heat in or on the surface. Operating the heater assembly may include direct power supply across a layer of dielectric or other resistance material.

The devices, systems and methods disclosed herein may allow for a conformable, variable thickness insulation/heater combination to reduce the amount of heater power needed to maintain internal surfaces exposed to the internal atmosphere above the dew point, thereby precluding condensation. One potential advantage relates to the reduced power requirements to maintain surface temperature of composite materials as compared to other types of heater devices. Another potential advantage may relate to the modular nature of the surface heater devices, and the ability to add, remove, and adjust positions of the device to provide desired surface heating on a variety of different structures and materials. A further potential advantage relates to the relatively uniform resistance of materials used, which provides even heating across a surface as long as the material is not cut through at locations of the power/wire leads. The devices disclosed herein may operate using a relatively low watt density due to uniformity of resistive material and spreading out of the resistance across a broad surface area, which may result in reduced touch hazard and lower failure modes. Further, the devices and systems of the present disclosure provide the ability to customize thermal resistance by layering and/or use of various insulating materials.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A surface heating device to control surface temperatures inside a spacecraft, the surface heating device comprising:
   a heater assembly having a surface to be heated, the surface being defined by a heater element, the surface being exposed within an interior of the spacecraft;
   an insulation layer positioned between the heater assembly and an exterior structure of the spacecraft;
   an encapsulation layer enclosing the insulation layer and connected to the heater assembly, wherein the insulation layer is removable from the encapsulation layer and wherein the surface heating device is releasably closed so as to permit removal, insertion, or replacement of the insulation layer;
   an attachment member configured to releasably attach the encapsulation layer to the exterior structure of the spacecraft;
   a controller configured to control the heater assembly to generate heat.

2. The surface heating device of claim 1, wherein the heater element includes a layer of dielectric material.

3. The surface heating device of claim 1, wherein the encapsulation layer provides a waterproof or water resistant enclosure for the insulation layer.

4. The surface heating device of claim 1, wherein the controller is connected to the heater element with a plurality of wires.

5. The surface heating device of claim 1, further comprising at least one temperature sensor configured to detect a temperature of the surface to be heated and generate a temperature signal used by the controller.

6. The surface heating device of claim 1, wherein the encapsulation layer completely encloses the insulation layer.

7. The surface heating device of claim 1, wherein the encapsulation layer provides a releasable opening for removal of the insulation layer.

8. A method of controlling surface temperatures inside a spacecraft, the method comprising:
   providing a surface heating device having:
      a heater assembly,
      thermal insulation material positioned adjacent to the heater assembly,
      an encapsulation layer surrounding the thermal insulation material and connected to the heater assembly, and
      a controller, wherein the insulation material is removable from the encapsulation layer and wherein the surface heating device is releasably closed so as to permit removal, insertion, or replacement of the insulation material;
   releasably mounting the encapsulation layer to a structure of the spacecraft with a surface of the heater assembly exposed within an interior of the spacecraft;
   operating the heater assembly with the controller to generate heat in the surface.

9. The method of claim 8, wherein operating the heater assembly includes directing a power supply across a layer of dielectric material.

10. The method of claim 8, wherein the encapsulation layer completely encloses the insulation material.

11. The method of claim 8, wherein the encapsulation layer provides a releasable opening for removal of the insulation material.

* * * * *